No. 728,992. PATENTED MAY 26, 1903.
H. F. SCHROEDER.
LAWN MOWER.
APPLICATION FILED OCT. 25, 1902.
NO MODEL.

Witnesses
D. M. Stewart
Caleb J. Rieber

Harry F. Schroeder, Inventor by

Attorney

No. 728,992. Patented May 26, 1903.

UNITED STATES PATENT OFFICE.

HARRY F. SCHROEDER, OF READING, PENNSYLVANIA.

LAWN-MOWER.

SPECIFICATION forming part of Letters Patent No. 728,992, dated May 26, 1903.

Application filed October 25, 1902. Serial No. 128,790. (No model.)

*To all whom it may concern:*

Be it known that I, HARRY F. SCHROEDER, a citizen of the United States of America, and a resident of Reading, in the county of Berks and State of Pennsylvania, have invented certain new and useful Improvements in Lawn-Mowers, of which the following is a specification.

My invention relates to that class of mowers in which rotary cutters are employed in connection with a stationary cutter; and it consists particularly in the improved adjusting and locking mechanism for said stationary cutter, as fully described in connection with the accompanying drawings, and specifically pointed out in the claims.

Figure 1 is a cross-sectional elevation showing a portion of a mower having my improvements applied thereto. Fig. 2 is a partial plan view of the same. Figs. 3 and 4 are separate views of the cylindrical nut and the adjustable cutter-bar, respectively, the latter taken on the line $x\ x$ of Fig. 1.

The general construction of the mower indicated is well known and need be only briefly referred to. The internally-geared drive-wheels 10 on shaft 11, suitably mounted in side frames 12 12, drive the reel or rotary cutter-shaft 13, which is also mounted in said frames and provided with pinions meshing with said drive-wheels. The stationary cutter 14, which coöperates with the usual spirally-arranged cutter-blades at the periphery of the reel 15, is adjustably secured to the tail portions 16 16 of the frames intermediate of the rear roller 17, which is adjustably carried between the ends of said tail portions and the reel. My improvements relate to the construction of the twin cutter-bar arms 18, between which said stationary cutter 14 extends, and the means for adjustably securing the same to the side frames of the machine, so as to provide for the convenient and accurate adjustment of the edge of the cutter 14 relative to the coacting edges of the rotary cutters on the reel and to the rigid securing of the same in adjusted position.

The separately-formed cutter-blade 14 is rigidly secured, as usual, to the forward end 19 of the cutter-bar 18, and the latter is supported upon pivot-bolts 20, passing through bearings 21 in the frames and screwed into lugs 22 of the cutter-bar arms. These arms are extended rearwardly from the pivotal connections for the purpose of regulating their pivotal position, so as to properly adjust the working edge 23 of the cutter-blade relative to the rotary cutters. I provide for this adjustment, as shown, by forming each cutter-bar arm with a cylindrically bored or recessed boss 24, located to the rear of the pivotal connection 20, and inserting therein a cylindrical nut 25, having a diametral screw-threaded opening 26, adapted to engage the correspondingly screw-threaded lower portion 27 of a differential adjusting-screw 28, the main body 29 of which latter is screw-threaded to a different pitch and engages a pivoted lug 30 on the side frame overhanging the boss 24. To provide for the free passage of the portion 27 of said adjusting-screw through said recessed boss into engagement with the rotary nut therein, I form said boss with opposite circumferentially-elongated openings 31 through the wall thereof adapted to permit an ample rocking movement of the cutter-bar on its pivotal connections to the side frames without contacting with the adjusting-screw 28, the turning of which latter in one direction or the other, as required, raises or lowers the engaging rotary nut 25 to properly adjust the cutter-blade, as already stated. This adjustment is thus effected with great nicety and convenience by a single operation and with a positive control of the cutter-bar at all times. Notwithstanding this positive holding of the cutter-bar in any position by the adjusting-screw 28 I prefer to provide in connection therewith an independent clamping means whereby it will be rigidly held in finally-adjusted position without subjecting what is primarily the adjusting mechanism to the strains and possible wear incident to practical service. For this purpose I therefore provide each cutter-bar arm with a rearward extension 32, having a slot 33, through which passes a clamping-screw 34, engaging a tapped hole in the frame or provided with a nut at its outer end, whereby the cutter-bar is rigidly secured to the frame except when adjustment of the cutter-blade is required, in which latter case the clamping-screw is merely loosened preliminary to such adjustment.

I do not desire to unduly limit myself to the construction specifically shown and described, as the same may obviously be modified without departing from my invention.

What I claim is—

1. In a lawn-mower the combination with the frame and rotary cutter, of a pivoted cutter-bar having a nut rotatably mounted therein, and a differential adjusting-screw for said bar having the differently-threaded portions thereof engaging said rotary nut and a fixed portion of the frame respectively.

2. In a lawn-mower the combination with the frame and rotary cutter, of a pivoted cutter-bar having a nut rotatably mounted therein, a differential adjusting-screw for said bar having the differently-threaded portions thereof engaging said rotary nut and a fixed portion of the frame respectively, and an independent locking means for the pivoted bar.

3. In a lawn-mower the combination with the frame and rotary cutter, of a pivoted cutter-bar having a cylindrically-bored boss with circumferentially-elongated openings through the wall thereof, a diametrally-tapped cylindrical nut located in said boss, and a differential adjusting-screw for said pivoted bar engaging said inserted nut substantially as set forth.

4. In a lawn-mower the combination with the frame and rotary cutter, of a pivoted cutter-bar having a cylindrically-bored boss with circumferentially-elongated openings through the wall thereof, and a slotted extension beyond said boss, a diametrally-tapped cylindrical nut located in said boss, a differential adjusting-screw for said pivoted bar engaging said inserted nut, and a locking-screw engaging said slotted extension, substantially as set forth.

Signed at Reading, Pennsylvania, this 6th day of October, 1902.

HARRY F. SCHROEDER.

Witnesses:
D. M. STEWART,
W. G. STEWART.